Aug. 29, 1967  J. A. REGAL  3,338,254
SAFETY GAS CONNECTION ASSEMBLY
Filed Jan. 13, 1965  4 Sheets-Sheet 1
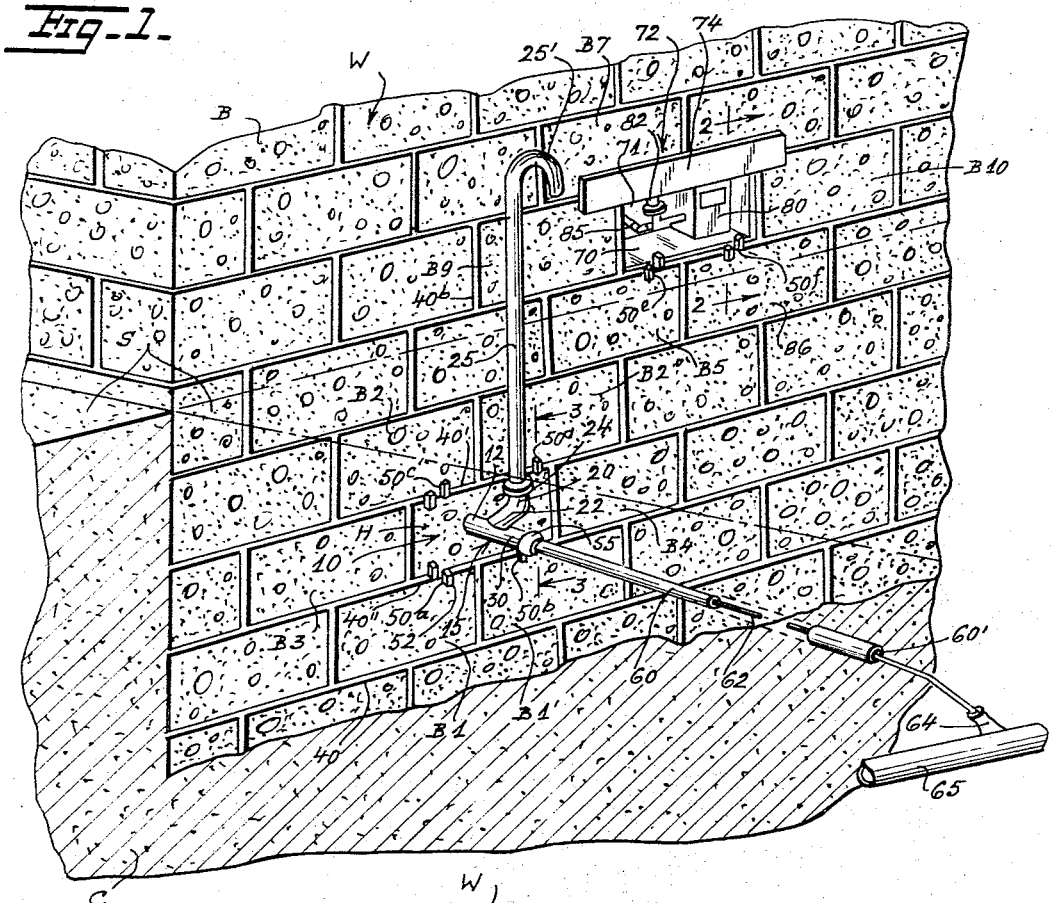
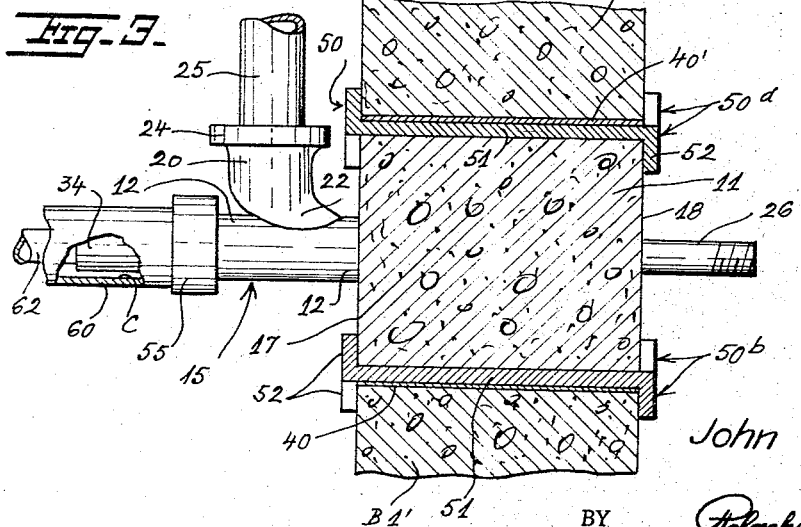
INVENTOR
John A. Regal
BY
Polachek & Saulsbury
ATTORNEYS.

Aug. 29, 1967 J. A. REGAL 3,338,254
SAFETY GAS CONNECTION ASSEMBLY
Filed Jan. 13, 1965 4 Sheets-Sheet 2
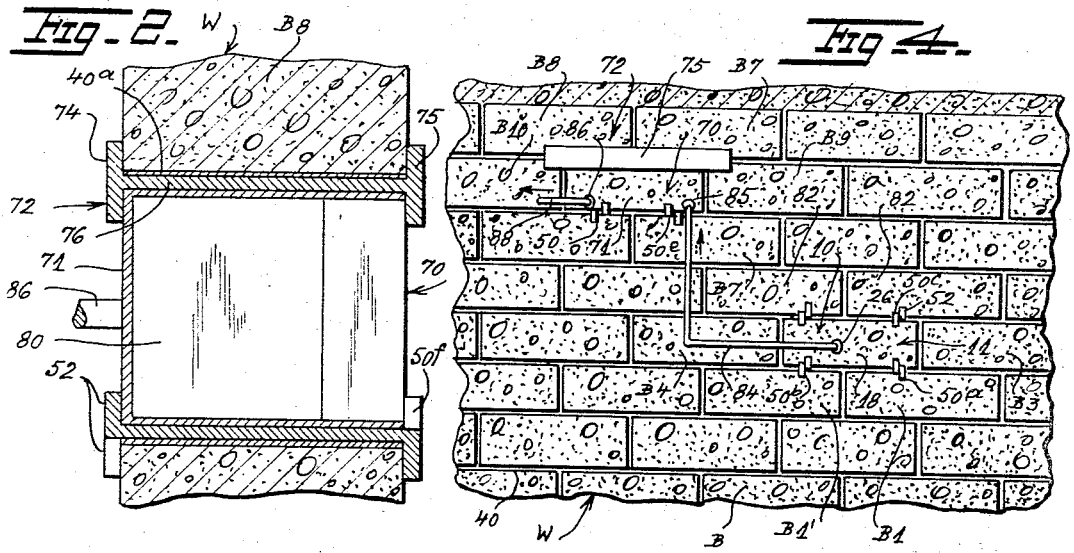
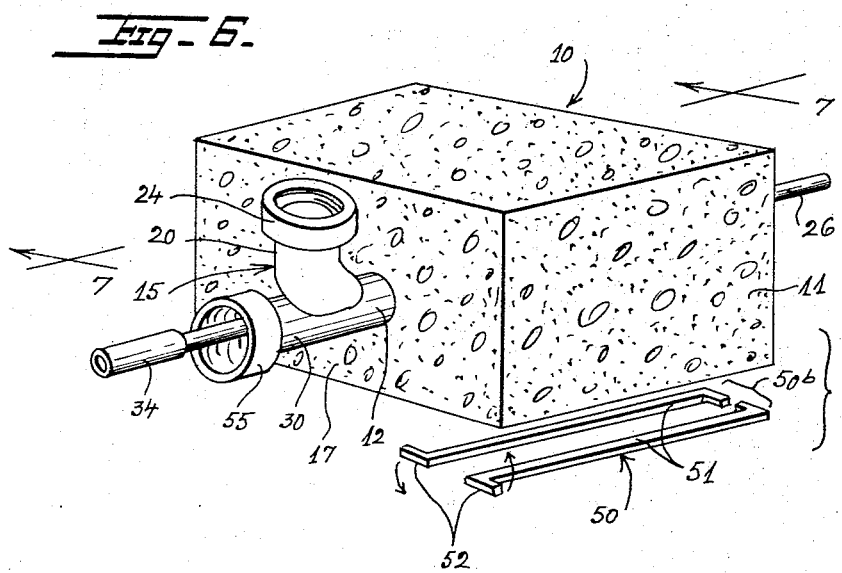
INVENTOR
John A. Regal
BY Polachek & Saulsbury
ATTORNEYS.

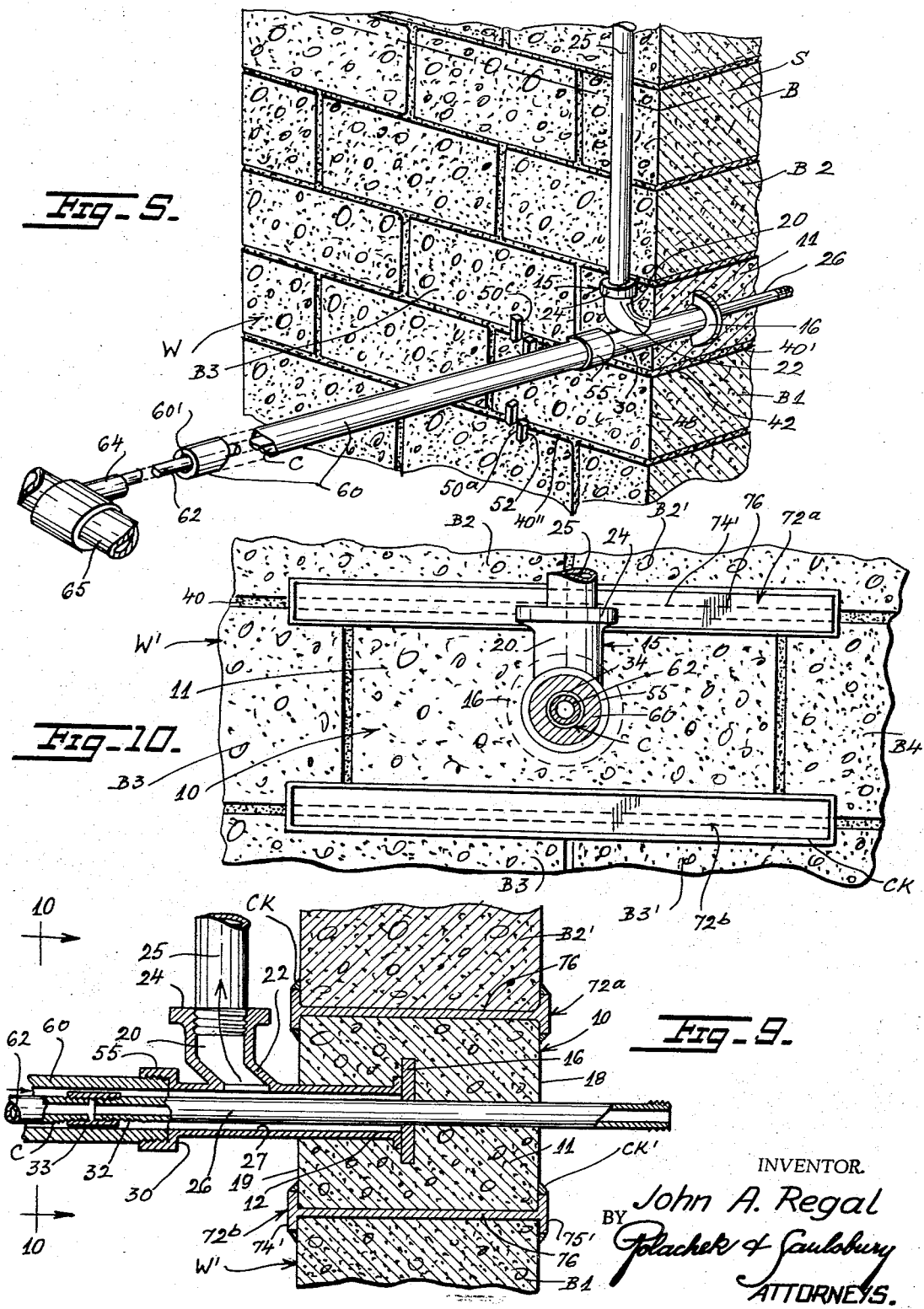

Aug. 29, 1967   J. A. REGAL   3,338,254
SAFETY GAS CONNECTION ASSEMBLY
Filed Jan. 13, 1965   4 Sheets-Sheet 4
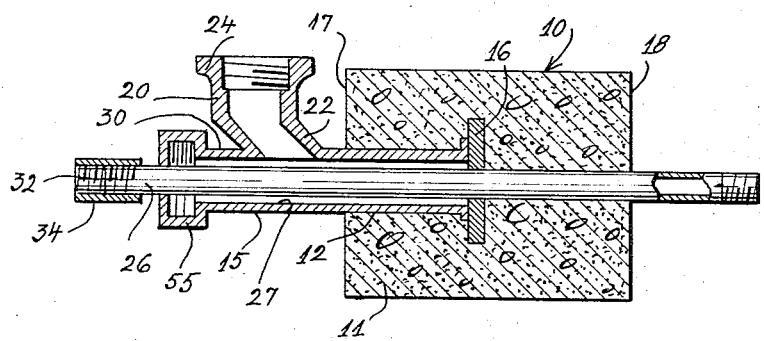
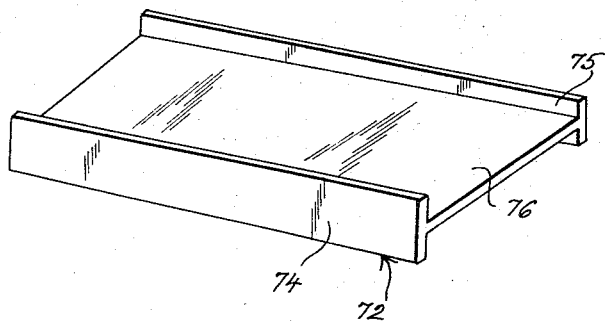
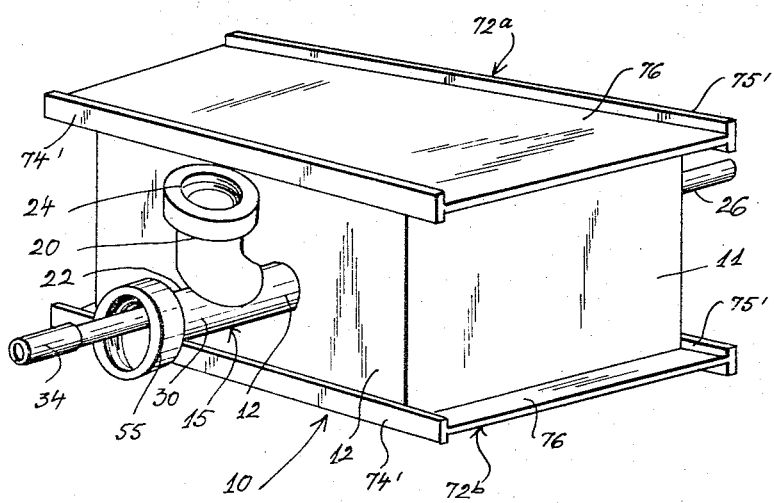
INVENTOR
John A. Regal
BY
Polachek & Saulsbury
ATTORNEYS.

United States Patent Office 3,338,254
Patented Aug. 29, 1967

3,338,254
SAFETY GAS CONNECTION ASSEMBLY
John A. Regal, R.D. 2, Box 139, Rockaway Valley
Road, Boonton, N.J. 07005
Filed Jan. 13, 1965, Ser. No. 425,176
15 Claims. (Cl. 137—68)

This invention concerns a gas connection system including an assembly or device for diverting and blocking leaking gas and venting the gas to the atmosphere.

Investigations conducted into the causes of numerous disastrous explosions and fires in newly built private homes, stores and other buildings, have revealed that practically all such explosions and fires resulted from inferior, inadequate connections made between exterior fuel gas distribution systems and interior piping. Generally gas mains were laid in shallow trenches in the public streets or roadways. Then smaller pipes were laid in shallow trenches and run from the gas mains to each of the buildings served by the particular gas main. At each building wall the smaller pipe was connetced to a freestanding meter. From the meter another pipe was run into the interior of the building through a hole knocked in the building wall. Very often the hole in the wall was patched up with putty or plaster only inside the building. This created a very unsafe and hazardous condition. The gas line or gas pipe running to the building had no secure anchor to the building. Power shovels working on the street to prepare for paving or to install other utility lines would snag on the gas main in the street or to the subsidiary smaller gas lines. The gas main or gas lines would be torn loose from their trenches and leaks would develop as the pipes and/or their couplings were strained or cracked. The newly filled in, porous earth around the gas main and smaller pipes would serve as passages for the leaking gas which would work back through the trenches to the building wall. From there the gas would seep into the building through the patched hole in which the plaster or putty very often was now loose and broken. The gas seeping into the building would explode on reaching the open flame of the hot water or space heating system of the building.

The present invention is directed at overcoming and preventnig the undesirable, dangerous and unsafe conditions described above. The invention is intended to protect life and property from danger of explosions and fires resulting from leakage or seepage of gases into buildings from outside the buildings. According to the invention a sleeve is provided around the gas line leading from a gas main to a building wall. The sleeve is connected to a Y-coupling which has a lateral arm venting to atmosphere. A leg of the Y-coupling is anchored in a cement or cinder block. The gas line is connected to a white metal coupling which in turn is connected to a short pipe nipple extending through the leg of the Y-coupling and through the block to the interior of the building.

Embedded in the block is an annular flange which is secured radially to the short pipe nipple and closes the inner end of the leg of the Y-coupling. The flanges serve as a positive stop member to block seepage of gas passed the Y-coupling so that all leaking gas vents through the lateral arm to atmosphere where it can readily be detected by its odor so that remedial steps can be taken to repair the condition. The sleeve pipe is concentric with the gas line and a cylindrical passage is defined therebetween through which leaking gas passes readily to the lateral venting arm of the coupling.

The white metal coupling is made of a frangible metal which has a breaking strength less than that of the short connecting pipe nipple in the block and of the gas line connected between the gas main and short pipe. This coupling will break if any unusual strain is exerted upon the gas main in the street or on the smaller gas pipe line tending to displace them. The gas leaking from the broken coupling will pass out through the lateral arm of the coupling.

Inside the building a pipe line is connected between the short pipe nipple at the block and a gas meter. This meter, according to a further feature of the invention, is mounted in a box which is installed in the building wall. The meter can be read from outside the building.

I-beam mounting plates and Z-bars are provided so that the gas meter box and gas block can be installed in an existing building wall or can be installed in a building wall during course of original construction.

It is therefore one object of the invention to provide a gas block assembly for blocking and diverting gas leaking from a gas line to vent the gas to the atmosphere.

Another object is to provide an assembly as described including a masonry block in which is embedded one end of a Y-coupling terminating at an annular flange secured to a short gas pipe nipple extending through the coupling and block and anchored in the block, and with a frangible coupling on one end of the pipe nipple.

A further object is to provide a device or assembly as described with a sleeve surrounding the gas line outside of the block, the sleeve being connected to the Y-coupling, the gas line being connected to the frangible coupling.

Still another object is to provide a gas connection assembly between a gas main outside a building and gas piping inside the building, said assembly including a gas pipe line disposed inside a concentric sleeve, a masonry block installed in the wall of the building, a Y-coupling having a leg embedded in the block, a pipe nipple extending through the block and leg of the Y-coupling and connected to the gas pipe line via a frangible white metal coupling, the sleeve being connected to the Y-coupling which has a lateral arm venting to atmosphere, with an annular flange plate located at the end of the leg of the Y-coupling inside the masonry block and secured around the pipe nipple.

A still further object is to provide a gas connection assembly as last described, further including a box installed in the building wall with a gas meter and interconnected regulator disposed in the box and exposed to the exterior of the wall, the interior gas piping being connected to the meter through an inner side of the box and the pipe nipple being connected by piping to the regulator.

Another object is to provide a gas connection assembly as described above wherein the box and masonry block are held in the building wall at the top and bottom thereof by means of I-beams and/or Z-bars.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIGURE 1 is a reduced perspective view of part of the exterior of a building with a gas connection assembly embodying the invention shown installed in a wall of the building, parts being broken away, FIG. 2 is an enlarged fragmentary sectional view taken on line 2—2 of FIG. 1, FIG. 3 is an enlarged fragmentary sectional view taken on line 3—3 of FIG. 1, FIG. 4 is a fragmentary interior elevational view of the building wall with gas connection assembly installed thereon, FIG. 5 is a fragmentary enlarged perspective view of part of the building wall and parts of the gas connection and leakage blocking assembly, FIG. 6 is a perspective view of a gas block assembly, with a pair of mounting Z-bars, FIG. 7 is a vertical sectional view taken on line 7—7 of FIG. 6, FIG. 8 is a perspective view of an I-beam, FIG. 9 is a sectional view similar to FIG. 7, showing another gas block assembly installed in a building wall, FIG. 10 is a front view, partially in section, of part of the building wall and gas block assembly, taken on line 10—10 of FIG. 9, and FIG. 11 is a perspective view of gas block assembly and mounting I-beam supports such as used in the showing of FIGS. 9 and 10.

Referring first to FIGS. 1–7, there is shown assembly 10 including a rectangular masonry block 11 made of concrete or other cementitious material. Embedded in the block at the time of forming thereof is the major portion of cylindrical leg 12 of a Y-coupling 15. The leg 12 is axially horizontal and terminates at an annular flange 16 extending vertically radially to the horizontal axis of the leg and secured to the end of the leg. The flange is located about midway between and parallel to the vertical front and rear faces 17, 18 of the block. The coupling has a laterally upward extending branch arm 20. The arm 20 is joined to leg 12 by an integral section 22 extending axially 45° to the axis of the leg 12. An internal thread is provided at the upper flanged end 24 of arm 20 to receive an axially vertical vent tube 25 of sufficient length so that the open end of upper curved elbow 25′ of the tube will be located at least twenty-eight inches above the surface S of ground G in which arm 20 is embedded. The vent tube 25 and upper end of arm 20 are axially aligned and vertical and parallel to the vertical block faces 17, 18.

A relatively short gas pipe nipple 26 extends axially through and is spaced from bore 27 in leg 12 and through outer leg 30. Opposite ends 32, 34 of the pipe 26 nipple are externally threaded. Nipple end 34 extends through the block and outwardly of rear face 18 of the block. An internally threaded frangible white metal coupling 33 is engaged on the forward threaded end 32 of pipe nipple 26. Leg 30 is axially horizontal. Flange 16 extends radially of and is secured at its inner periphery to pipe nipple 26. There is thus a hermetic seal at the end of leg 12 and intermediate portion of nipple 26 to the flange 16 at its inner and outer peripheries.

Assembly 10 with block 11 in which is partially embedded Y-coupling 15 and pipe nipple 26 is shown in FIGS. 1, 3–5, installed in the foundation wall W made of concrete or cinder blocks or bricks B. The block 11 can be made of the same material as blocks B but this is not essential. Thus block 11 can be made of concrete while blocks B are cinder blocks, fired bricks, cinder blocks, field stone, etc. In any case blocks B are held together by mortar grout 40. Block 11 is anchored in the wall by four pairs 50a–50d of Z-bars 50. Each Z-bar as best shown in FIGS. 3 and 6, has a long central section 51 whose length is substantially equal to the horizontal depth of block 11. At ends of section 51 are two fingers 52 coplanar with section 51 and turn in opposite directions 90° to section 51 but parallel to each other. The sections 51 are locked in the grout 40′ and 40″ above and below the top and bottom sides of block 11. In each pair of adjacent bars, one finger 52 extends upwardly while the other adjacent finger extends downwardly.

The block 11 is installed in a hole left in a previously constructed wall by taking out one of the blocks B. Fresh mortar is applied on top of block 11, on top of blocks, B1, B1′ below the hole and at facing sides of end blocks B3, B4. The Z bars are placed on the fresh mortar on blocks B1 and 11 with fingers disposed in a horizontal plane as shown in FIG. 6. Then after the block 11 is inserted into the hole between blocks B1, B1′ and B2, B2′ the Z-bars are each turned 90°. The bars in each pair thereof are turned in opposite directions so that the fingers 52 assume vertical positions engaging inner and outer sides of the upper and lower blocks B′, B1′, B2, B2′ and effectively holding block 11 in the wall. Any displaced mortar is replaced and reset by a pointing tool.

The forward end of leg 30 is formed with a cylindrical flange 55 which is internally threaded and engages the externally threaded end of a sleeve pipe 60. Pipe 60 encloses gas pipe line 62 which has a threaded end engaged with coupling 33 in a gas-tight joint. The pipe line 62 extends outwardly underground to a fitting 64 forming part of the main gas line 65. Sleeve pipe 60 will extend close to the gas line 65, but may terminate at end 60′ as much as twelve inches or so from the gas line 65. It will be noted that sleeve pipe 60 surrounds pipe line 62 to define cylindrical chamber C.

A box 70 having closed inner side 71 and open outer side is also mounted in wall W as shown in FIGS. 1, 2 and 4. Two pairs of Z-bars 50e, 50f are disposed below the box and anchor the box to lower blocks B5, B6. An I-beam 72 is disposed over the box 70. This I-beam has a pair of vertical flanges 74, 75 at opposite edges of horizontal plate 76; see FIG. 8. Mortar grout 40a overlays the plate 76 under blocks B7, B8. The I-beam is longer than the box 70 so that the ends of the flanges engage outer and inner sides of upper blocks B7, B8 and end blocks B9, B10. Mortar grout 40b is applied at ends of the box between the box and blocks B9, B10. In the box is a gas meter 80 to which is connected a gas regulator 82. Pipe nipple 26 is connected to gas piping 84 on the inside of the building at the inner side of wall W as shown in FIG. 4. Piping 84 is connected to regulator 82 through a coupling 85 which passes through the inner side 71 of the box. The meter has an outlet pipe 86 opening at the inside of the building to which the gas supply piping 88 for the building is connected.

By the arrangement described, the meter and gas regulator are exposed at the exterior of the building but are installed in a box forming an integral part of wall W.

The block and pipe assembly 10 installed as shown in FIGS. 1, 3–5 will operate as follows. The sleeve pipe 60 surrounding the gas pipe line 62 shields it from unusual stresses and strains imposed by loads such as heavy rollers passing over the surface of ground G above the pipe 60. If in time gas pipe line 62 or gas main 65 should develop a crack due to unusual expansion or contraction caused by a sudden change in temperature or due to displacement by an earth moving machine, or due to some other cause, the gas which seeps out through the crack will be trapped in the cylindrical chamber C surrounding pipe 62. If this gas flows along pipe 62, it will be retained and guided by sleeve 60 until the leaking gas reaches arm 20 of the coupling whereupon the gas will be discharged via vent pipe 25 which extends above ground at its open upper end. The flange 16 serves to anchor the coupling 15 in the block 11 and also serves as a gas stop preventing seepage of leaking gas along and around pipe nipple 33 and the outside of leg 12 of the coupling. The odor of gas escaping from vent pipe 25 will serve to alert occupants of the building of which wall W is a foundation wall, so that the defect in pipe 62 or main 65 can be found and corrected. The gas leaking from a crack in pipe 62 into the chamber C may flow outwardly of the sleeve pipe 60 to escape from the free end 60′ of the pipe under the street or roadway where the main gas line 65 is located. In any case the odor of the escaping gas at either end of the sleeve pipe 60 will indicate that a defect has developed in the gas supply line 62. The leaking gas will be effectively blocked from passing through wall W and entering the house. Heretofore many fires and explosions have occurred in houses where leaking gas seeped into the houses from the outside due to defects in the outside parts of the gas supply lines as mentioned previously. The present invention effectively prevents this condition from occurring. Furthermore, it serves to protect and reinforce the gas pipe line, and localizes the points of gas leakage so that the location of a defect in the gas supply system can be found quickly.

Assembly 10 including masonry block 11 with Y-coupling 15 and pipe nipple 26 embedded therein as shown in FIGS. 1, 3–7 may be supplied as a finished manufactured member to a house construction site, to a house undergoing renovation or to a house where a new gas pipe line 62 is being installed. The new wall block 11 will form an integral part of the foundation wall W. Installation may be facilitated when the assembly 10 is being installed in a wall being newly constructed by use of mounting I-beams 72a, 72b similar to I-beam 72 of FIG. 8, may be used as shown in FIGS. 9, 10 and 11. The front and rear flanges 74', 75' will engage front and rear sides of blocks B' to anchor the block 11 securely in the wall W'. Parts of the wall W' and assembly 10 in FIGS. 9–11 corresponding to those of wall W and assembly 10 in FIGS. 1–7 are identically numbered. If desired, caulking CK, CK' can be provided at the edges of flanges 74', 75'.

The block and pipe assembly 10 will comply with substantially all building and construction codes regulating installation of gas piping, foundation walls of houses, etc., and will conform with requirements of fire underwriters and other inspection agencies.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A gas connection assembly for blocking and diverting leaking gas, comprising a rectangular masonry block having flat top, bottom, front, rear and end faces, a Y-coupling pipe having a first cylindrical leg, said having a major portion thereof embedded in said block in an axially horizontal position parallel to said top, bottom and end faces, said leg having a forward portion extending axially forward of the front face of the block, an annular flat ring flange having one side secured to one end of said leg in said block, said flange being disposed in a vertical plane parallel to the front and rear faces of the block, said coupling having a cylindrical other leg integral with and extending in horizontal axial alignment therewith forwardly of the front face of the block, a short gas pipe nipple extending axially through the aligned legs of the Y-coupling pipe and spaced radially therefrom, opposite ends of the pipe nipple extending outwardly beyond the opposite ends of the axially horizontal legs of the Y-coupling pipe, said pipe nipple having an intermediate section secured to an inner periphery of the flange and anchored in the block, said coupling having an arm disposed axially perpendicular to the horizontal axes of the legs and communicating laterally with said legs to provide a lateral outlet for leaking gas passing around the forward end of said pipe nipple and through said other leg.

2. A gas connection assembly for blocking and diverting leaking gas as described in claim 1, said arm being axially vertical for discharging leaking gas into the atmosphere, a frangible short pipe coupling engaged on the forward end of the pipe nipple, a gas pipe line attached to said short pipe coupling, said short pipe coupling having a breaking strength less than that of said pipe nipple and said gas pipe line, and a sleeve pipe coaxial with said gas pipe line and surrounding the same to define a cylindrical passage therebetween communicating with said arm, said sleeve pipe having one end secured to the forward end of the other leg of the Y-coupling for conducting the leaking gas through said passage to said arm.

3. A gas connection assembly for blocking and diverting leaking gas as described in claim 2, and an axially vertical vent pipe secured at one end to said arm, said vent pipe having a turned down open other end for discharging the leaking gas into the atmosphere forwardly of the block.

4. A gas connection assembly for blocking and diverting leaking gas, comprising a rectangular masonry block having flat top, bottom, front, rear and end faces, a Y-coupling pipe having a first cylindrical leg, said leg having a major portion thereof embedded in said block in an axially horizontal position parallel to said top, bottom and end faces, said leg having a forward portion extending axially forward of the front face of the block, an annular flat ring flange having one side secured to one end of said leg in said block, said flange being disposed in a vertical plane parallel to the front and rear faces of the block, said coupling having a cylindrical other leg integral with and extending in horizontal axial alignment therewith forwardly of the front face of the block, a short gas pipe nipple extending axially through the aligned legs of the Y-coupling pipe and spaced radially therefrom, opposite ends of the pipe nipple extending outwardly beyond the opposite ends of the axially horizontal legs of the Y-coupling pipe, said pipe nipple having an intermediate section secured to an inner periphery of the flange and anchored in the block, said coupling having an arm disposed axially perpendicular to the horizontal axes of the legs and communicating laterally with said legs to provide a lateral outlet for leaking gas passing around the forward end of said pipe nipple and through said other leg, and a frangible short pipe coupling engaged on the forward end of said pipe nipple for attachment of a gas pipe line to the frangible short coupling, said short coupling having a breaking strength less than that of said pipe nipple and of said gas pipe line.

5. A gas connection assembly for blocking and diverting leaking gas, comprising a rectangular masonry block having flat top, bottom, front, rear and end faces, a Y-coupling pipe having a first cylindrical leg, said leg having a major portion thereof embedded in said block in an axially horizontal position parallel to said top, bottom and end faces, said leg having a forward portion extending axially forward of the front face of the block, an annular flat ring flange having one side secured to one end of said leg in said block, said flange being disposed in a vertical plane parallel to the front and rear faces of the block, said coupling having a cylindrical other leg integral with and extending in horizontal axial alignment therewith forwardly of the front face of the block, a short gas pipe nipple extending axially through the aligned legs of the Y-coupling pipe and spaced radially therefrom, opposite ends of the pipe nipple extending outwardly beyond the opposite ends of the axially horizontal legs of the Y-coupling pipe, said pipe nipple having an intermediate section secured to an inner periphery of the flange and anchored in the block, said coupling having an arm disposed axially perpendicular to the horizontal axes of the legs and communicating laterally with said legs to provide a lateral outlet for leaking gas passing around the forward end of said pipe nipple and through said other leg, said arm being axially vertical, and an axially vertical vent pipe secured to said arm for discharging the leaking gas into the atmosphere forwardly of the block.

6. A gas connection assembly for blocking and diverting leaking gas, comprising a rectangular masonry block having flat top, bottom, front, rear and end faces, a Y-coupling pipe having a first cylindrical leg, said leg having a major portion thereof embedded in said block in an axially horizontal position parallel to said top, bottom and end faces, said leg having a forward portion extending axially forward of the front face of the block, an annular flat ring flange having one side secured to one end of said leg in said block, said flange being disposed in a vertical plane parallel to the front and rear faces of the block, said coupling having a cylindrical other leg integral with and extending in horizontal axial alignment therewith forwardly of the front face of the block, a short gas nipple extending axially through the aligned legs of the Y-coupling pipe and spaced radially therefrom, opposite ends of the pipe nipple extending outwardly beyond the opposite ends of the axially horizontal legs of the Y-coupling pipe, said pipe nipple having an intermediate section secured to an inner periphery of the flange and anchored in the block, said coupling having an arm disposed axially perpendicular to the horizontal axes of the legs and communicating laterally with said legs to provide a lateral outlet for leaking gas passing around the forward end of said pipe nipple and through said other leg, and a frangible short pipe coupling engaged on the forward end of said pipe nipple for attachment of a gas pipe line to the frangible short coupling, said short coupling having a breaking strength less than that of said pipe nipple and of said gas pipe line, said other leg having a flange on its forward end for securing a pipe sleeve thereto in axial alignment with, concentrically surround and radial spaced from said gas pipe line.

7. A gas connection assembly for use between a gas main and gas supply piping inside of a building having a vertical wall, comprising a rectangular masonry block for installation in a wall as an integral part thereof, said block having flat top, bottom, front, rear and end faces, a Y-coupling pipe having a first cylindrical leg, said leg having a major portion thereof embedded in said block in an axially horizontal position parallel to said top, bottom and end faces, said leg having a forward portion extending axially forward of the front face of the block, an annular flat ring flange having one side secured to one end of said leg in said block, said flange being disposed in a vertical plane parallel to the front and rear faces of the block, said coupling having a cylindrical other leg integral with an extending in horizontal axial alignment therewith forwardly of the front face of the block, a short gas pipe nipple extending axially through the aligned legs of the Y-coupling pipe and spaced radially therefrom, opposite ends of the pipe nipple extending outwardly beyond the opposite ends of the axially horizontal legs of the Y-coupling pipe, said pipe nipple having an intermediate section secured to an inner periphery of the flange and anchored in the block, said coupling having an arm disposed axially perpendicular to the horizontal axes of the legs and communicating laterally with said legs to provide a lateral outlet for leaking gas passing around the forward end of said pipe nipple and through said other leg, said arm being axially vertical for discharging leaking gas into the atmosphere, a frangible short pipe coupling engaged on the forward end of the pipe nipple, a gas pipe line attached to said short pipe coupling, said short pipe coupling having a breaking strength less than that of said pipe nipple and said gas pipe line, and a sleeve pipe coaxial with said gas pipe line and surrounding the same to define a cylindrical passage therebetween communicating with said arm, said sleeve pipe having one end secured to the forward end of the other leg of the Y-coupling for conducting the leaking gas through said passage to said arm, and an axially vertical vent pipe secured at one end to said arm, said vent pipe having a turned down open other end located above ground for discharging the leaking gas into the atmosphere forwardly of the block, said Y-coupling, pipe nipple, gas pipe line and sleeve pipe all being located below ground at said wall.

8. A gas connection assembly as described in claim 7, and a plurality of pairs of Z-bars disposed on top of and underneath said block anchoring the block in said wall.

9. A gas connection assembly as described in claim 7, and a pair of I-beams disposed on top of and underneath said block respectively anchoring said block in said wall.

10. A gas connection as described in claim 7, and a box installed above ground in said wall, said box having a closed rear side and open front, a gas regulator and gas meter in said box exposed at the front of the box, said meter and regulator being connected together, and piping at the rear side of said wall connecting the gas regulator and rear end of the pipe nipple block, said meter having an outlet pipe extending through the rear side of the box for connection to the gas supply piping inside the building.

11. A gas connection assembly according to claim 10, comprising a plurality of pairs of Z-bars disposed on top of and underneath said block anchoring the block in said wall.

12. A gas connection assembly according to claim 10, further comprising an I-beam disposed on top of the box and a plurality of pairs of Z-bars below the box anchoring the box in said wall.

13. A gas connection assembly according to claim 11, further comprising a plurality of pairs of other Z-bars disposed on top of and underneath said block anchoring said block in said wall.

14. A gas connection assembly according to claim 11, further comprising a pair of other I-beams disposed on top of and underneath said block respectively and anchoring said block in said wall.

15. A gas connection assembly according to claim 14, wherein said I-beams are longer than said box and said block for engaging parts of said wall adjacent to said box and said block respectively.

References Cited

UNITED STATES PATENTS

| | | | |
|---|---|---|---|
| 1,836,408 | 12/1931 | Sutton | 52—221 |
| 2,744,815 | 5/1956 | Heck | 48—193 |
| 2,871,113 | 1/1959 | Hammers | 48—192 |

WILLIAM F. O'DEA, *Primary Examiner.*

D. R. MATTHEWS, *Assistant Examiner.*